United States Patent
Barriga et al.

(10) Patent No.: US 8,549,615 B2
(45) Date of Patent: Oct. 1, 2013

(54) METHOD AND APPARATUSES FOR END-TO-EDGE MEDIA PROTECTION IN AN IMS SYSTEM

(75) Inventors: Luis Barriga, Johanneshov (SE); Rolf Blom, Jarfalla (SE); Yi Cheng, Sundbyberg (SE); Fredrik Lindholm, Alvsjo (SE); Mats Naslund, Bromma (SE); Karl Norrman, Stockholm (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 280 days.

(21) Appl. No.: 12/744,720

(22) PCT Filed: Dec. 1, 2008

(86) PCT No.: PCT/IB2008/003288
§ 371 (c)(1),
(2), (4) Date: May 26, 2010

(87) PCT Pub. No.: WO2009/068985
PCT Pub. Date: Jun. 4, 2009

(65) Prior Publication Data
US 2011/0010768 A1    Jan. 13, 2011

Related U.S. Application Data

(60) Provisional application No. 60/991,014, filed on Nov. 29, 2007.

(51) Int. Cl.
*H04L 29/06* (2006.01)
*G06F 15/16* (2006.01)
(52) U.S. Cl.
USPC ...................... 726/14; 726/1; 726/4
(58) Field of Classification Search
None
See application file for complete search history.

(56) References Cited

U.S. PATENT DOCUMENTS 6,088,801 A * 7/2000 Grecsek ........................... 726/1
7,545,868 B2 * 6/2009 Kennedy et al. ............... 375/259
(Continued)

FOREIGN PATENT DOCUMENTS

JP     2005295468 A    10/2005
JP       3730480 B2     1/2006
(Continued)

OTHER PUBLICATIONS

Rosenberg et al, "An Offer/Answer Model with the Session Decription Protocol", Jun. 2002, Network Working Group Request fro Comments, RFC 3264, p. 1-25.*
3rd Generation Partnership Project. "Clarifications on Requirements in Media Security." 3GPP TSG SA WG3 Security—S3#49, S3-070735, Munich, Germany, Oct. 8-12, 2007.
(Continued)

*Primary Examiner* — Christopher Revak
(74) *Attorney, Agent, or Firm* — Coats & Bennett, P.L.L.C.

(57) ABSTRACT

An IMS system includes an IMS initiator user entity. The system includes an IMS responder user entity that is called by the initiator user entity. The system includes a calling side S-CSCF in communication with the caller entity which receives an INVITE having a first protection offer and parameters for key establishment from the caller entity, removes the first protection offer from the INVITE and forwards the INVITE without the first protection offer. The system includes a receiving end S-CSCF in communication with the responder user entity and the calling side S-CSCF which receives the INVITE without the first protection offer and checks that the responder user entity supports the protection, inserts a second protection offer into the INVITE and forwards the INVITE to the responder user entity, wherein the responder user entity accepts the INVITE including the second protection offer and answers with an acknowledgment having a first protection accept. A method for supporting a call by a telecommunications node.

6 Claims, 4 Drawing Sheets

(56) References Cited

U.S. PATENT DOCUMENTS

| | | | | |
|---|---|---|---|---|
| 8,086,872 | B2* | 12/2011 | Kim et al. | 713/191 |
| 8,195,816 | B2* | 6/2012 | Yamasaki et al. | 709/229 |
| 2001/0047474 | A1 | 11/2001 | Takagi et al. | |
| 2002/0112052 | A1* | 8/2002 | Brittingham et al. | 709/224 |
| 2005/0060411 | A1* | 3/2005 | Coulombe et al. | 709/227 |
| 2006/0288423 | A1 | 12/2006 | Le et al. | |
| 2007/0150511 | A1* | 6/2007 | Laguna-Macias et al. | 707/104.1 |
| 2012/0084451 | A1* | 4/2012 | Schneider et al. | 709/229 |

FOREIGN PATENT DOCUMENTS

| | | | |
|---|---|---|---|
| WO | 2006087819 | A1 | 8/2006 |
| WO | 2006124054 | A2 | 11/2006 |
| WO | 2006125474 | A1 | 11/2006 |
| WO | 2007/023286 | A1 | 3/2007 |

OTHER PUBLICATIONS

Fischl, J. et al. "Framework for Establishing an SRTP Security Context using DTLS." Internet Engineering Task Force, SIP Internet-Draft, draft-ietf-sip-dtls-srtp-framework-00.txt, Nov. 12, 2007.

"IMS—core of NGN (5): Mechanism of IMS session control and AS connection," Jan. 15, 2007, Internet, URL http://wbb.forum.impressrd.jp/feature/20070115/372.

IMS—core of NGN (4): IMS access security (part 2) IMS registration by means of IMS-AKA, Oct. 13, 2006, Internet, URL http://wbb.forum.impressrd.jp/feature/20061012/300.

Ikeno, N. et al., "Present-day Encryption Theory," The Institute of Electronics, Information and Communication Engineers, Nov. 15, 1997, pp. 263-264, The sixth impression of the first edition, Japan.

* cited by examiner

METHOD AND APPARATUSES FOR END-TO-EDGE MEDIA PROTECTION IN AN IMS SYSTEM

TECHNICAL FIELD

The present invention pertains to media protection control with respect to a session control invitation message. (As used herein, references to the "present invention" or "invention" relate to exemplary embodiments and not necessarily to every embodiment encompassed by the appended claims.) More specifically, the present invention pertains to selecting an appropriate media protection, e.g. end to edge media protection with respect to an SIP INVITE message in an IMS system between a initiator user entity and a responder user entity.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Many network access technologies (GSM, WCDMA, WLAN, WiMAX) provide some basic security for the "first hop". However, not all of them can be considered sufficiently secure and some accesses do not provide any built-in security, e.g. IEEE 802.3. In particular, in fixed line access there is usually no logical protection of user traffic and thus protection relies solely on the difficulty to access the physical media carrying the traffic. Therefore in "Fixed-Mobile Convergence" (FMC) scenarios there is a need to be able to provide at least IMS controlled end-to-access edge (e2) security, i.e. security for the media transport across the access network. This is needed to be able to provide uniform protection of traffic in different types of networks. MMTEL is one such application which needs to be secured to earn users' trust. SRTP (RFC3711) and MIKEY (RFC3830) are examples of protocols for media security and key management that have been proposed to this end. Other applications or enablers like IM, PoC and Presence, such as the ones specified by the Open Mobile Alliance (OMA), would also benefit by an e2æ security solution.

Another type of media protection that might be needed for certain applications is end-to-end (e2e) protection, i.e. from terminal to terminal (or terminal to application server for server based applications). However, true e2e protection would make it impossible to provide network support for e.g. transcoding. In the description below the terminal to access edge solution is the focus. E2e protection of media, true or with plaintext available for network supported functions like PoC. are described in the international publication WO 2009/070075 A 1.

In IMS according to 3GPP standard, the session control/set-up signaling is protected between the P-CSCF and the terminal, either with IPSec or with TLS. Thus, the real need for protection from the terminal to the access edge is only for the media traffic.

One possible solution for terminal to access edge protection of media, built upon an existing protocol, would be to use an IPSec tunnel between the terminal and a security gateway (SGW) at the edge of the trusted IMS core domain (or at some other secure location). Such a tunnel could protect all media traffic from the UE to the edge of the secure network. However, use of IPsec tunnels gives heavy message expansion and makes traffic policing difficult.

It would, of course, also be possible to use existing protocols like SRTP for media protection and MIKEY (or SDES) for key management to protect the media path between the UE and e.g. the SGSN or C-BGF. However, applying it as is has the following problems in that a terminal to access edge solution may:

Interfere with possible end-to-end solutions, in case the user may use such for certain scenarios.

Cause problems with security policies between the home network and visited network in a roaming situation.

Have problems with key management and authentication of users/networks.

Lack means for the UE to indicate to the network prior to session establishment if it supports media security at all and if that is the case, which type of media protection it supports.

The invention in US patent US 2006/0288423 to Franck et al provides media protection of media flows between a network element such as an end point, for instance a mobile user terminal, and another network element over an access network. Franck et al does not disclose pre-registration of media security capabilities of a user terminal that may result in excessive control plane signaling.

BRIEF SUMMARY OF THE INVENTION

The present invention pertains to a SIP/IP Core System, exemplified here with the IMS system. The system comprises an IMS initiator user entity. The system comprises an IMS responder user entity that is called (or in general, invited to participate in media exchange) by the initiator user entity. The system comprises a initiator side S-CSCF in communication with the initiator entity which receives an INVITE having a first protection offer and parameters for key establishment from the initiator entity, removes the first protection offer from the INVITE and forwards the INVITE without the first protection offer. The system comprises a responder side S-CSCF in communication with the responder user entity and the initiator side S-CSCF which receives the INVITE without the first protection offer and checks that the responder user entity supports media protection, inserts a second protection offer into the INVITE and forwards the INVITE to the responder user entity, wherein the responder user entity accepts the INVITE including the second protection offer and answers with an acknowledgment having a first protection accept.

The present invention pertains to a method for supporting a protected media session by a telecommunications node, such as an S-CSCF. The method comprises the steps of receiving a session control invitation message from a initiator user entity to a responder user entity having an offer for media protection. There is the step of acting on the offer from the invitation message according to network policy. There is the step of forwarding the message with a modified offer to the responder party. There is the step of receiving an acknowledgment back from the responder user entity. There is the step of modifying the acknowledgment to include parameters to direct media traffic to an edge entity selected to be a media protection end port and also information to establish a corresponding SA.

The present invention also pertains to a method for supporting a protected media session by a telecommunications node, such as a responder side S-CSCF. The method comprises the steps of receiving a session control invitation message from an initiator side S-CSCF user entity to a responder user entity having no offer for media protection. There is the step of acting on the offer from the invitation message according registered security capabilities of the responder user entity. There is the step of forwarding the message with a modified offer to the responder user entity. There is the step of receiving an acknowledgment back from the responder party comprising a first protection accept. There is the step of removing the first protection accept in the acknowledgment. There is the step of forwarding the acknowledgement without the accept to the initiator side S-CSCF.

The present invention pertains to a media control signalling entity operative in a communication network by processing and forwarding media control signalling messages between an initiator user entity and a responder user entity. The media control signalling entity comprises a first network interface for receiving a first invitation message from the initiator user entity. The media control signalling entity comprises a second network interface for forwarding a second invitation message to the responder user entity. The media control signalling entity comprises a process unit in communication with said first and second network interfaces. The process unit operable for creating the second invitation message from first invitation message by:

determining if the first invitation message contains a first offer for media protection creating the second invitation message from the first invitation message by:

at least removing the first media protection offer if included in the first invitation message, at least inserting a second media protection offer if the first invitation message is without a first protection offer and if said responder user entity has registered at least one media security capability with said communication network, the second media protection offer corresponding said registered media security capability.

BRIEF DESCRIPTION OF THE DRAWINGS

In the accompanying drawings, the preferred embodiment of the invention and preferred methods of practicing the invention are illustrated in which.

DETAILED DESCRIPTION

Depending on the desired security level and the need to perform operations on the media in the network (e.g. transcoding) there is a need to provide media security between the endpoints (user terminal) and an appropriate termination point in the network.

From security point of view, a "true" end-to-end solution, where plaintext media and keys are only available at the endpoints (terminals) is clearly preferred. However, it makes network functions such as transcoding or lawful intercept difficult. The invention distinguishes the following types of media protection.

End-to-Access-Edge (e2ae)

In this case, media is protected between the UE and some Edge Entity (EE). This solution solves the security problems related to any access technology specific threats and since it decrypts the media "as early as possible", it enables transcoding/adaptation of the media anywhere inside the core and IMS networks.

End-to-Middle (e2m)

Here, traffic is protected between UE and some "middlebox", e.g. the Border Entity (BE) or some Application Server (AS) or enabler. It is assumed that outbound egress traffic from the AS/BE is re-encrypted as it exits. This provides for higher security (the only threat is basically interception inside the BE/AS itself) but also means that media manipulation is only (conveniently) possible in one place. Note that the main difference between e2m and e2ae is that the entity terminating the security is slightly more "upstream" in the network and that it is responsible for re-encrypting outgoing traffic. Hence the main difference lies in which node that is given access to the media protection keys (the BE/AS or the EE) and we may therefore focus on the e2ae case, the e2m case being very similar. Thus, It should be understood that whenever e2ae procedures are discussed, e2m procedures can be handled in analogy. When referring generically to a BE, EE, SGW or AS as termination point of e2ae or e2m security, the notation media plane handler is used.

End-to-End (e2e)

this provides the best security, but also causes the most problems for other media operations. Lawful Intercept will in this case be possible as long as the keys are known in the network and can be performed either by delivering media together with keys to the Law Enforcement Agency (LEA), or delivering a decrypted media stream to the LEA. This is called "end-to-end with network support" (e2n2e).

Figure 3:
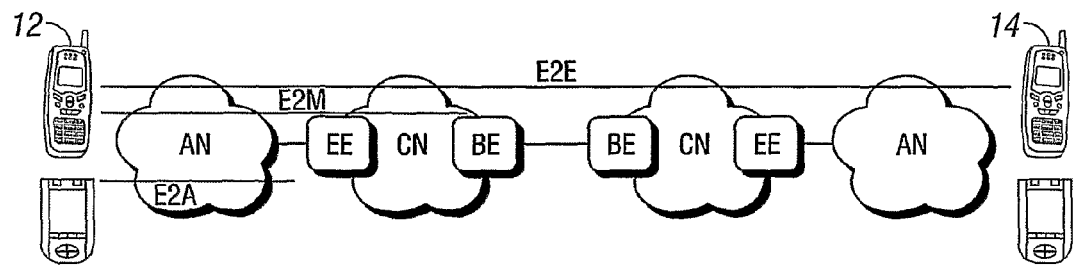
FIG. 3 is a representation of the three different types of security afforded by the present invention.

Thus, there are reasons motivating support for all four scenarios: e2e, e2n2e, e2m, and e2ae. FIG. 3 shows the three options.

Figure 1:
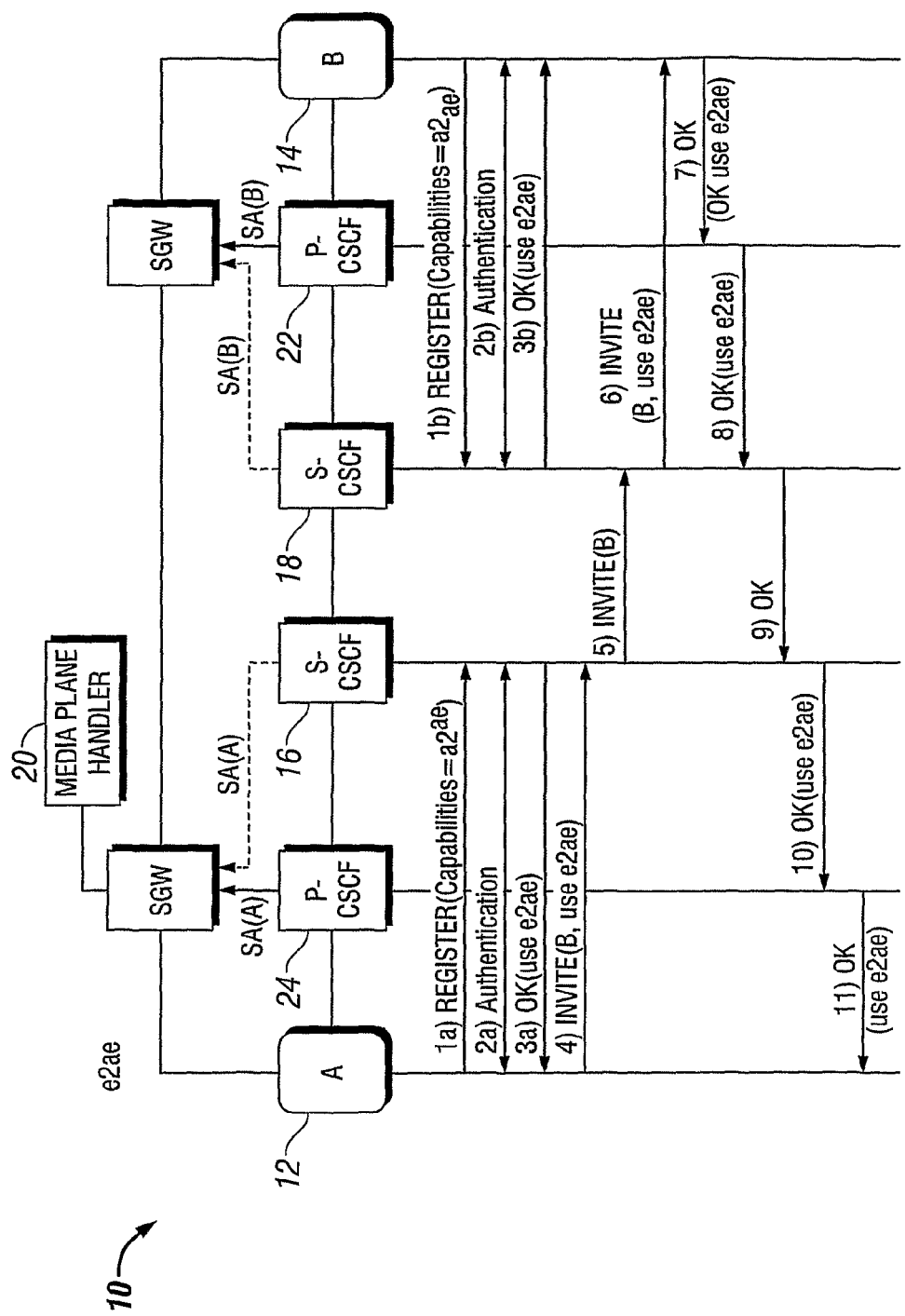
FIG. 1 is a simplified signaling diagram for controlling the use of e2ae protection.

Referring now to the drawings wherein like reference numerals refer to similar or identical parts throughout the several views, and more specifically to FIG. 1 thereof, there is shown an IMS system 10. The system 10 comprises an IMS initiator user entity 12. The system 10 comprises an IMS responder user entity 14 that is called by the initiator user entity 12. The system 10 comprises an initiator side S-CSCF 16 in communication with the initiator entity which receives an INVITE having a first protection offer and parameters for key establishment from the initiator entity, removes the first protection offer from the INVITE and forwards the INVITE without the first protection offer. The system 10 comprises a responder side S-CSCF 18 in communication with the responder user entity 14 and the initiator side S-CSCF 16 which receives the INVITE without the first protection offer and checks that the responder user entity 14 supports media protection, inserts a second protection offer into the INVITE and forwards the INVITE to the responder user entity 14, wherein the responder user entity 14 accepts the INVITE including the second protection offer and answers with an acknowledgment having a first protection accept.

Preferably, the system 10 includes a user entity media plane handler 20, and wherein the responder user entity 14 derives key material and establishes an SA together with a signal to the user entity media plane handler 20 instructing the user entity media plane handler 20 to enable immediate protection based on the SA. The system 10 preferably includes a responder side P-CSCF 22 in communication with the responder user entity 14 which receives the acknowledgment from the responder user entity 14 and forwards the acknowledgment to the receiving end S-CSCF 18. Preferably, the responder side S-CSCF 18 removes the first protection accept in the acknowledgment and forwards the acknowledgement without the accept to the initiator side S-CSCF 16. Establishing an SA could comprise for instance the user entity and the media plane handler performing a key exchange or otherwise communicating the SA to the media plane handler.

The initiator side S-CSCF 16 preferably modifies the acknowledgment to include a second protection accept that the protection should be used. Preferably, the system 10 includes a initiator side P-CSCF 24 in communication with the initiator side S-CSCF 16 and the initiator side user entity, and the initiator side S-CSCF 16 forwards the acknowledgment with the second protection accept to the initiator side P-CSCF 24. The initiator side P-CSCF 24 preferably forwards the acknowledgment with the second protection accept to the initiator user entity 14.

Preferably, the initiator side user entity receives the acknowledgment with the second protection accept from the P-CSCF, derives key material and establishes the SA together with a signal to the user entity media plane handler 20, instructing the media plane handler 20 to enable media protection based on the SA. Establishing an SA could comprise for instance the user entity and the media plane handler performing a key exchange or otherwise communicating the SA to the media plane handler.

The present invention pertains to a method for supporting a protected media session by a telecommunications node. The method comprises the steps of receiving a session control invitation message from a user entity to a responder user entity having an offer for protection. There is the step of acting on the offer from the invitation message according to network policy. There is the step of forwarding the message with a modified offer to the responder party. There is the step of receiving an acknowledgment back from the responder party. There is the step of modifying the acknowledgment to include parameters to direct media traffic to a media plane handler selected to be a protection end port and also information to establish a corresponding SA.

Preferably, the receiving the session control invitation message includes the step of receiving an SIP INVITE message. The acting step preferably includes the step of removing the offer from the INVITE message. Preferably, the network policy comprises information on the suitability of end to end vs end to access edge protection, e.g. implied by the need to perform transcoding, etc. Preferably, the receiving the INVITE message step includes the step of receiving the INVITE message from an initiator IMS user entity to a responder IMS user entity having the offer for protection. The receiving the INVITE message step preferably includes the step of receiving the INVITE message having the offer which includes parameters for key establishment.

Preferably, there is the step of deriving keys for the protection to be used with the SA. There is preferably the step of the IMS initiator and/or responder user entity registering media security capabilities of a terminal. Preferably, the media security capabilities include at least one of end to access edge, end to end with network support functions allowed, or true end to end protection. The deriving step preferably includes the step of deriving the keys from already existing security associations used to protect SIP signaling, or with a key management system, or from on-line key generation at the terminal based on public key solutions.

Preferably, there is the step of instructing a P-CSCF to derive the key and sending it to a media plane handler together with instructions that media protection should be used. There are preferably the steps of retrieving the SA from either a P-CSCF or an S-CSCF, deriving the key and sending the key to a media plane handler together with instructions that media protection should be used. Preferably, there are the steps of instructing a media plane handler that media protection is applied and the media plane handler requesting the key from a P-CSCF.

The present invention also pertains to a method for supporting a protected media session by a telecommunications node, such as an responder side S-CSCF. The method comprises the steps of receiving a session control invitation message from an initiator side S-CSCF user entity to a responder user entity having no offer for media protection. There is the step of acting on the offer from the invitation message according registered security capabilities of the responder user entity. There is the step of forwarding the message with a modified offer to the responder user entity. There is the step of receiving an acknowledgment back from the responder party comprising a first protection accept. There is the step of removing the first protection accept in the acknowledgment. There is the step of forwarding the acknowledgement without the accept to the initiator side S-CSCF.

Figure 5:
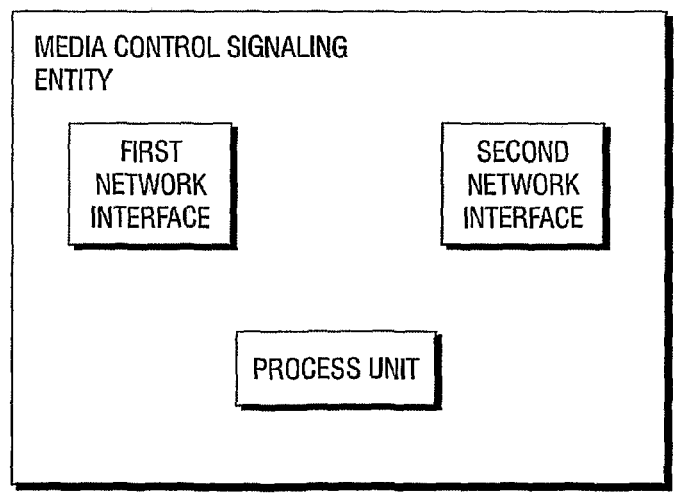
FIG. 5 is a block diagram of a media control signalling entity

Referring to FIG. 5, the present invention pertains to a media control signalling entity operative in a communication network by processing and forwarding media control signalling messages between an initiator user entity and a responder user entity. The media control signalling entity comprises a first network interface for receiving a first invitation message from the initiator user entity. The media control signalling entity comprises a second network interface for forwarding a second invitation message to the responder user entity. The media control signalling entity comprises a process unit in communication with said first and second network interfaces. The process unit operable for creating the second invitation message from first invitation message by:

determining if the first invitation message contains a first offer for media protection creating the second invitation message from the first invitation message by:

at least removing the first media protection offer if included in the first invitation message, at least inserting a second media protection offer if the first invitation message is without a first protection offer and if said responder user entity has registered at least one media security capability with said communication network, the second media protection offer corresponding said registered media security capability.

The second media protection offer can be an offer for end to access edge media protection. The first and second invitation messages can be SIP messages. The media control signalling entity can further comprises S-CSCF functions.

In the operation of the invention, the invention is described in an IMS framework. First, it is noted that an IMS user must REGISTER with the IMS system 10 and that when registering, the end user should also register the media security capabilities of the terminal. The invention introduces three new media-security capabilities as discussed above, end to access edge (e2æ), end to end with network support functions allowed (e2n2e) or true end to end (e2e) protection. Note that these security capabilities need to be accompanied with indications of the type of key management and security protocols that the terminal supports. In this description, it is assumed that terminals at least register support for e2æ protection. For the key management there are three distinct use cases. The first is that keys are derived from already existing security association used to protect the SIP signaling, the second case is when a separate key management system is used, in particular key management as described in the international publication WO 2009/070075 but also with predistributed keys, and finally the third key management system is to rely on on-line key generation in the terminals based on e.g. Diffie- Hellman (DH) or other Public Key (PK) solutions, e.g. according to MIKEY or IKEv2. The security protocol is preferably SRTP, but also other protocols such as TIS, IPsec, etc., are possible.

For e2ae media protection, it is allowed that the initiator and responder user enitiy in principle are treated independently. For instance, the initiator may get one type of media protection and the responder may get another type (possibly no protection). In the description below, the initiator side procedures is first described and then the responder side procedures.

A user in IMS, initiating a call, sends an INVITE message to the responder party. The INVITE message may include an offer for e2æ protection. This offer is detected and handled by the initiator side S-CSCF, which will remove it from the INVITE before the INVITE is forwarded to the responder party. When the responder party returns a "200 OK", the S-CSCF will modify the OK to indicate that the protection offer has been accepted. The modified OK message will include all parameters needed by the terminal to direct its media traffic to the edge entity selected to be the protection endpoint and also all information needed to establish the corresponding SA. As already mentioned, the key(s) to be used can be derived from already existing SA's shared by the terminal and the network, established with the help of a separate key management system 10 or they could be generated on the fly (D-H, PK) by the protection end-points. An example of a protection mechanism based on key generation in the endpoints is the solution developed in IETF, which is called RTPSEC.

Figure 4:
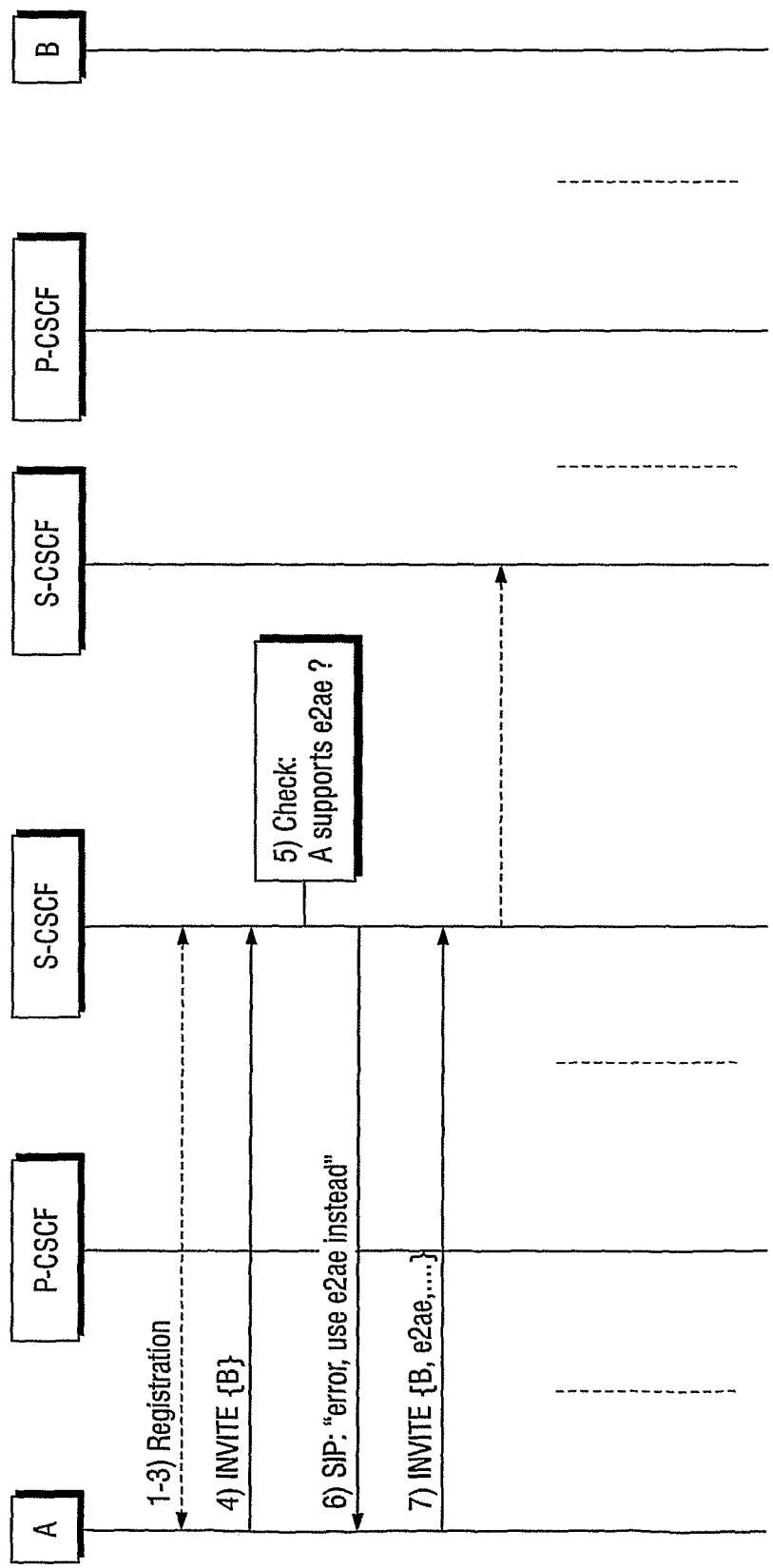
FIG. 4 shows another signaling diagram according to an embodiment of the invention.

Now, with reference to FIG. 4, if the initiator terminal excludes the e2æ protection offer but the initiator side S-CSCF still wants to enforce use of e2ae protection, it may act on it by sending a SIP error message (e.g. "488 NOT ACCEPTABLE HERE") message indicating that the service in the INVITE, i.e. no protection, is not available and indicate to terminal that it should use end-to-edge protection, e.g. due to network (security) policy. Before doing this, it should of course check that the initiator terminal has registered that it supports this e2ae capability. The application of access edge to end protection at the responder side could be a decision purely based on network policies. However, it could be envisioned that if the initiator side applies this type of protection this is indicated in the SIP signaling to inform the responder side that the call preferably should be given the same level of protection at the responder side.

At the responder side the responder party's S-CSCF checks if the responder terminal supports e2ae encryption. If so, it acts on it and inserts an offer for e2ae media protection in the INVITE message. The terminal accepts the protection offer. The key generation/management works the same way as for the initiator side.

An offer to use e2æ protection can be carried e.g. in the SDP part of the SIP messages in accordance with e.g. MIKEY [RFC 3830, RFC 4567] or SDES [RFC 4568]. The keying information provided in the SDP part of the message can later be used to setup SRTP. For other media, such as MSRP, PSK-TLS could be used, based on the keying information provided. Other media protection protocols may also be used to protect content/messages carried in SIP by MESSAGE.

The key to be used for the media protection may be derived from the keys used to protect the SIP signaling between the initiator/responder terminal and the initiator/responder side P-CSCF. The key could be pushed to the media plane handler (e.g. SGW, AS, BE or EE) from the P-CSCF when P-CSCF from inspection of the SIP messages determines that protection should be applied or the initiator (or responder) side S-CSCF can order the initiator (or responder) side P-CSCF to deliver them or the S-CSCF can itself transfer the keying information. If the keying material comes from another SA the key distribution mechanism has to be adapted accordingly.

When a key management solution as described in PCT/SE2007/050927 is used, the calling terminal requests a key and a voucher from the Key Management Server (KMS) and includes the voucher in the INVITE. The S-CSCF retrieves the voucher and presents it to the KMS which returns the key to be used. At the responder side the S-CSCF will request a key and a (new) voucher from the KMS and include it in the INVITE. The responder will then present it to the KMS and request the corresponding key.

E2n2e and e2m

The e2n2e and e2m case can easily be envisioned as slight variations of the above description.

The main difference for this case is that the controlling entity (e.g. S-CSCF/MRFC) has to make sure that not only the incoming media is protected but also the outgoing. If protection ends and begins in the same node (typically for e2n2e) this should not be a real problem but if the protection ends in one node and begins in another node (e2m), some kind of indication needs to be signaled from the first node to the second node.

The (true) e2e case differs in that no network entities have an active role in the signaling of the protection capabilities. In this case, the calling/called party's S-CSCF would simply let the offer for protection in the invitation pass through it (assuming the network policy allows e2e protection).

A very high level simplified signalling diagram can be found in FIG. 1. The description of the signalling flow is given below. It covers e2 æ protection when keys are based on existing SA's used to protect SIP signalling.

1a/b The initiator UE registers with the IMS system 10 by sending a REGISTER including its capabilities regarding at least e2æ protection.

2a/b The initiator UE is authenticated to make the registration valid.

3a/b The initiator UE gets a 200 OK confirming the registration, and may acknowledge support of the registered e2æ capability.

4 The initiator UE sends an INVITE containing an offer to use e2æ protection including parameters for key establishment.

The initiator side S-CSCF 16 inspects the INVITE and notices that e2æ protection is offered. As the network is capable of e2æ protection it tacitly accepts the offer and stores the decision.

Note that the initiator side P-CSCF does not do anything in this stage.

The initiator side S-CSCF may already now initiate SA derivation if it is done in the S-CSCF, and send the derived keys to the MRFC. If the key derivation is done in the initiator side P-CSCF the derivation is deferred.

5 The initiator side S-CSCF 16 removes the e2 æ protection offer from the INVITE and forwards it to the responder side S-CSCF 18.

The responder side S-CSCF 18 inspects the INVITE and checks if the responder party supports e2æ protection (it is assumed that the responder has already registered this).

6 The responder side S-CSCF 18 inserts an e2æ protection offer before the INVITE is forwarded to the responder UE. The offer includes parameters necessary to establish a shared SA. The SDP part must also be changed to route the media via the media plane handler (here assumed to be a SGW) if the media plane handler is a separate entity, not included in the normal media path.

The responder UE accepts the INVITE including the e2æ offer. It derives the keys to be used and establishes an SA together with a signal to the UE media plane handler 20 instructing it to enable media protection based on the that SA.

7 The responder UE answers with a 200 OK accepting the e2æ offer. When the responder side P-CSCF 22 receives the 200 OK and if it is the responsibility of the P-CSCF to generate SAs for e2æ protection it inspects the 200 OK derives the SA. The responder side P-CSCF would then push the SA and other information needed to the SGW and request that it enables media protection.

8 The responder side P-CSCF forwards the 200 OK to the responder side S-CSCF 18.

If it is the responsibility of the responder side S-CSCF to generate the SA it would do that and push the information to the SGW (same procedure as described for P-CSCF).

9 The rec responder side S-CSCF 18 removes the e2æ protection accept in the 200 OK and forwards the modified 200 OK to the initiator side S-CSCF 16.

The initiator side S-CSCF 16 remembers that e2æ protection should be used and modifies the 200 OK to show this.

If it is the responsibility of the initiator side S-CSCF to generate the SA to be used, it does this and pushes it together with other information needed by the SGW and requests the SGW to enable media protection.

10 The initiator side S-CSCF forwards the 200 OK with the acceptance of using e2æ protection to the initiator side P-CSCF.

If it is the responsibility of the initiator side P-CSCF to generate SAs for e2æ protection it inspects the 200 OK and notices that e2æ protection has been agreed and thus derives the SA. The initiator side P-CSCF would then push the SA and other information needed by the SGW and request that the SGW enable media protection.

11 The initiator side P-CSCF forward the 200 OK to the initiator UE. The UE notices that the e2æ protection offer has been accepted and derives the keys to be used. It establishes an SA together with a signal to the UE media plane handler 20, instructing the media plane handler 20 to enable media protection based on the provided SA.

As stated above, the offers and answers could be carried in SDP using SDES or MIKEY but other encodings can be envisioned.

In practice, the media security may be terminated in different edge devices (media plane handlers) for IMS. It also depends on whether the media plane handler is normally included in the media path, or, if the presence of the media plane handler is only due to the need to act as end-point for e.g. e2ae protection. In the former case, signalling of security data to the media plane handler can be "piggy-packed" in already existing set-up signalling, whereas in the second case, explicit signalling (including a signal to the UE to re-direct its traffic) may be needed. Above description differs slightly depending on place where the media will be terminated. If the protection ends in the MRFP, the MRFC will be the entity that needs to receive the derived keys from the S-CSCF and push this down to the MRFP.

The usage of the media security capabilities are as follows:
The terminal registers the supported capabilities. This is to allow network initiated protection and this would most likely only be e2æ or e2n2e.

The network may e.g. according to policy decide that certain media-security modes are not supported and therefore indicate to the UE that the media-security mode is not supported.

If more than one capability has been registered, this can later be used either by the network, or another terminal to find out what the best media security solution to use is, i.e. whether to use e2e, e2n2e or e2æ

In case a UE sends an INVITE to another UE with both, e.g., e2e and e2æ offers, the entities in-between the two end points needs to verify that they support these and/or that network policy allows them. If e.g., one of these are not supported, the network could indicate this e.g. by removing the capability it does not support, so when the terminating UE receives the request, it will have the choices left that both the originating UE and all network entities in-between supports. Another way to handle this is to let any network entity who does not support a specific media-security capability to send back an error indicating this. And the UE would then have to retry without using that capability.

Keys for e2æ Protection Based on Existing SA's

If IPsec is used to protect the SIP signaling between the P-CSCF and the terminal, the used keys will be available in the P-CSCF and possibly in the S-CSCF. If TLS based on server certificates and client authentication by http digest is used then the TLS SA will only be available in the P-CSCF.

Anyhow, the S-CSCF or an associated MRF will be responsible for performing the policy control and initiating key derivation and distribution. Depending on implementation choices made in existing systems there are different options for how this function is best implemented. From a principal point of view the following options are possible:

1. The S-CSCF/MRF will instruct the P-CSCF to derive the media protection key and send it to the media plane handler together with instructions that media protection should be used.

2. The S-CSCF/MRF will retrieve the SA from the P-CSCF (or S-CSCF), derive the key and send it to the media plane handler together with instructions that media protection should be used.

3. The S-CSCF/MRF will instruct the media plane handler that media protection shall be applied and the media plane handler requests the derived key from the P-CSCF.

4. The S-CSCF/MRF will instruct the media plane handler that it should explicitly establish an SA with the UE, e.g. based on derived keys according to either of 1-3 above, or, using Diffie-Hellman of public key techniques.

Keys Based on Vouchers

In this case, the S-CSCF/MRF will send a received voucher to the KMS and request the corresponding key. It would then send the key to the SGW together with instructions that media protection should be used. This is described in more detail in the international publication WO 2009/070075 A1.

When initiating protection the S-CSCF/MRF will request a key and voucher from the KMS.

Figure 2:
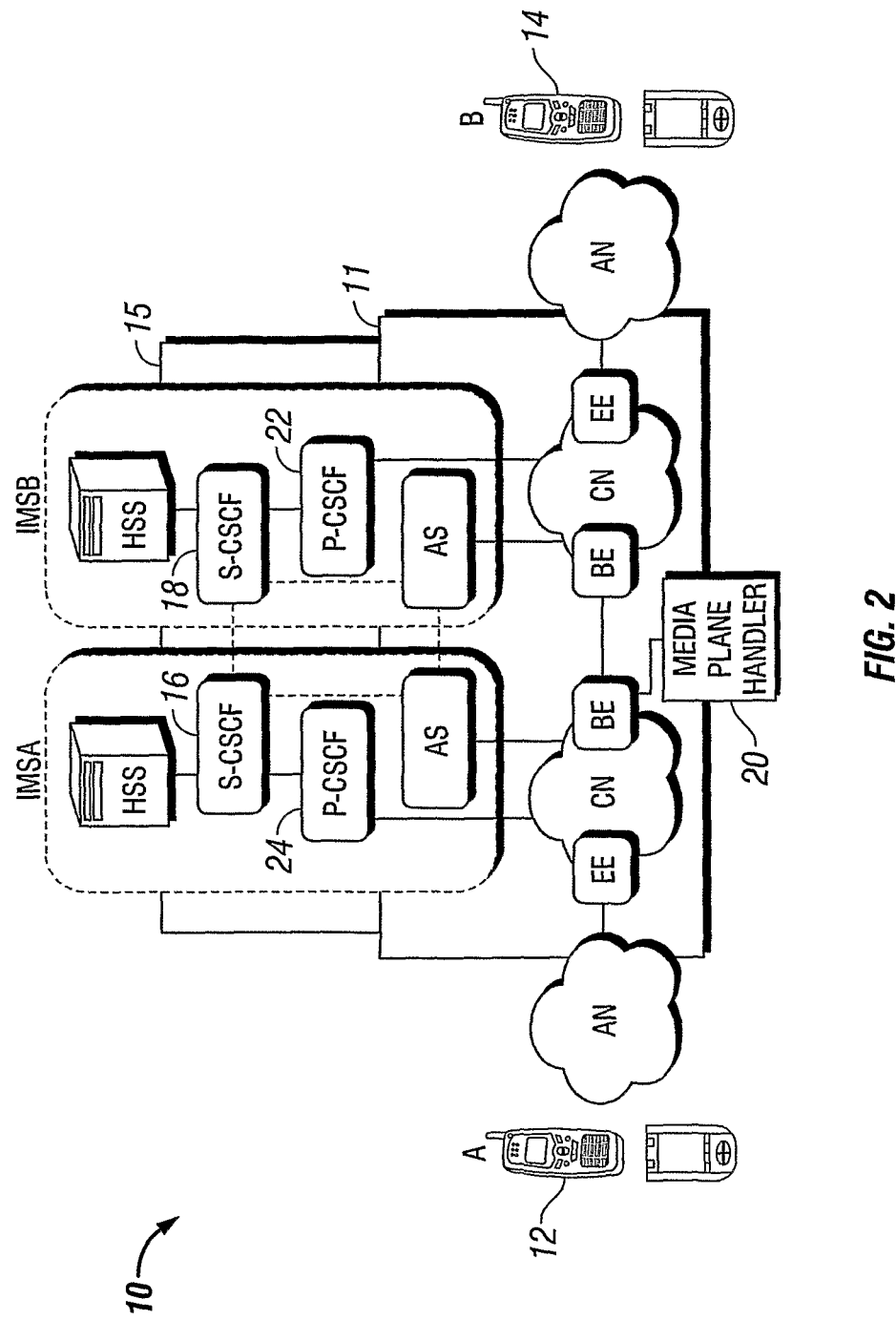
FIG. 2 is a diagram of an IMS network reference model.

FIG. 2 shows reference architecture used herein.

User/media plane nodes are shown in box 11 and SIP control plane nodes are shown in box 15. The EE is (some) edge entity at the edge of the fixed core network. BE is some border entity at the border between the two networks. The AS is some IMS application server or OMA enabler, e.g. a PoC server or an Instant Messaging server. (In the notation used above, AS, EE and BE are all media plane handlers.)

FIG. 2 assumes both A and B are ISIM enabled users, but since IMS is assumed to be common to many different access technologies, the required use of (hardtoken) UICC may be too restrictive, in particular since non-ISIM based mechanisms already exist for IMS authentication.

A straightforward solution is to also allow usage of soft-ISIM. However, even this may be a limitation since there are also deployments of other forms of user credentials, e.g. public/private keys distributed in hardware or software.

Therefore, although support for ISIM is a foremost concern, the solution targeted will only assume that some form of cryptographic (secret key bases) user credential is in use and that this credential can be used to authenticate the user and establish a common shared (base) session key. Solutions that fall in this category are: ISIM, PKI, IBC (identity based cryptography), username/password, etc.

The following are examples of IMS services which can be supported by the invention.

MMTEL

By this, it is meant conventional peer-to-peer (P2P) multimedia telephony or a conference call in a small group. In the group case, it is assumed a "conference bridge" is implemented as an IMS AS or OMA enabler. Set-up is signaled via normal SIP mechanisms and the media is carried by RTP. In the group case, the SIP servers (CSCF's) could for instance modify the security in the SIP offers so that security is e2m provided between each user and the AS or enabler.

Push-to-Talk

Here, PoC service refers to a service set up using SIP signaling and where a PoC server is used as application server (AS) or enabler to distribute RIP-transported media to the receivers. The "PoC server" in the actual product usually refers to the control plane part, but here, it refers generically to both the control plane and media plane (MRF) parts as "the PoC server". This case could be handled similarly to the conference call discussed above.

Messaging

This can either be messages carried directly in the SIP body, or, set up by SIP and carried over MSRP. An AS/enabler acts as messaging server. Also here the messages can be P2P or directed to a group.

Instant Vs Deferred Services

Messaging services are typically implemented so that if the recipient is not online, the message is automatically converted to a deferred message and stored in an AS until the recipient registers. In fact, also MMTEL and PoC can support deferred delivery with the server acting as a "phone answering machine".

Besides well-known IMS related terms such as HSS, CSCF, MRF, etc., we use the following abbreviations are used herein.

AS (IMS) Application Server
BE Border Entity
BSF Bootstrapping Server Function
EE Edge Entity
EPS Evolved Packet System
GBA Generic Bootstrapping Architecture
LEA Law Enforcement Agency
LI Lawful Intercept
NAF Network Application Function
NSPS National Security and Public Safety
P2P Peer-to-peer
CBGF Core Border Gateway Function
CSCF Call State Control Function
DH Diffie-Hellman
e2ae End-to-Access-Edge
e2e End-to-end
FMC Fixed-Mobile Convergence
GSM Global System for Mobile Communication
IKE Internet Key Exchange (RFC 4306)
IM Instant Messaging
IMS IP Multimedia Subsystem (3GPP standard)
IPSec IP Security protocol (RFC 4301)
KMS Key Management Server
MIKEY Multimedia Internet KEYing (RFC 3830)
MMTEL MultiMedia TELephony
MRF Multimedia Resource Function
MRFC MRF Control
MRFP MRF Processor
MSRP Message Session Relay Protocol (RFC 4975)
P-CSCF Proxy-CSCF
PK Public Key
PoC Push-to-talk over Cellular
PSK-TLS Pre-shared Key TLS
RTP Real time Transport Protocol (RFC 3550)
RTPSEC RTP Secure Keying
SA Security Association
S-CSCF Serving-CSCF
SDES Session Description Protocol Security Descriptions (RFC 4568)
SDP Session Description Protocol (RFC 4566)
SGW Security Gateway
SIP Session Initiation Protocol (RFC 3261)
SRTP Secure Real time Transport Protocol (RFC 3711)
TLS Transport Layer Security (RFC 5246)
UE User Equipment
WCDMA Wideband Code Division Multiple Access
WiMAX Worldwide Interoperability for Microwave Access (IEEE 802.16)
WLAN Wireless Local Access Network (IEEE 802.11)

Although the invention has been described in detail in the foregoing embodiments for the purpose of illustration, it is to be understood that such detail is solely for that purpose and that variations can be made therein by those skilled in the art without departing from the scope of the invention except as it may be described by the following claims.

The invention claimed is:

1. A method for supporting a protected media session by a telecommunications node using control plane signaling comprising:
receiving a session control invitation message from an initiator user entity that has registered media security capabilities, and wherein the session control invitation message has a first offer for protection, from a user entity and directed to a responder user entity;
acting on the offer in dependence on the registered security capabilities;
forwarding the message to the responder user entity; and
receiving an acknowledgement from the responder user entity.

2. The method of claim 1, wherein the media security capabilities include at least one of end to access edge, end to middle, end to end with network support functions allowed, or true end to end protection.

3. The method of claim 1, wherein the forwarded message to the responder user entity includes a second offer for protection created in dependence of registered security capabilities of the responder user.

4. A media control signaling entity operative in a communication network by processing and forwarding media control signaling messages between an initiator user entity and a responder user entity, said media control signaling entity comprising:
a network interface for receiving a session control invitation message from an initiator user entity that has registered media protection capabilities, wherein the session control invitation message has a first offer for protection from the initiator user entity and directed to a responder user entity; and a processing unit configured to act on the offer of protection in dependence on the registered media protection capabilities.

5. The media control signaling entity of claim 4, wherein said media protection capabilities comprise end to access edge media protection.

6. The media control signaling entity of claim 4, wherein the media control signaling entity is further configured to provide S-CSCF functions.

* * * * *

UNITED STATES PATENT AND TRADEMARK OFFICE
CERTIFICATE OF CORRECTION

PATENT NO. : 8,549,615 B2
APPLICATION NO. : 12/744720
DATED : October 1, 2013
INVENTOR(S) : Barriga et al.

It is certified that error appears in the above-identified patent and that said Letters Patent is hereby corrected as shown below:

On the Title Page

Item (75), under "Inventors", in Column 1, Line 2, delete "Jarfalla" and insert -- Järfälla --, therefor.

Item (75), under "Inventors", in Column 1, Line 4, delete "Alvsjo" and insert -- Älvsjö --, therefor.

Item (75), under "Inventors", in Column 1, Line 4, delete "Mats Naslund," and insert
-- Mats Näslund, --, therefor.

Item (73), under "Assignee", in Column 1, Line 1, delete "Ericsson," and insert -- Ericsson (publ), --, therefor.

Item (56), under "OTHER PUBLICATIONS", in Column 2, Line 1, delete "Rosenberg et al," and insert -- Rosenberg et al., --, therefor.

Item (56), under "OTHER PUBLICATIONS", in Column 2, Lines 1-2, delete "Decription" and insert -- Description --, therefor.

Item (56), under "OTHER PUBLICATIONS", in Column 2, Line 2, delete "fro" and insert -- for --, therefor.

In the Specification

In Column 1, Line 36, delete "(e2)" and insert -- (e2ae) --, therefor.

In Column 1, Line 45, delete " e2æ " and insert -- e2ae --, therefor.

In Column 1, Line 55, delete "PoC." and insert -- PoC, --, therefor.

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,549,615 B2

In Column 3, Line 25, delete "protection" and insert -- protection, --, therefor.

In Column 3, Line 50, delete "entity" and insert -- entity. --, therefor.

In Column 4, Line 25, delete "this" and insert -- This --, therefor.

In Column 6, Line 33, delete "protection" and insert -- protection, --, therefor.

In Column 6, Line 54, delete " $(e2ae),$ " and insert -- (e2ae), --, therefor.

In Column 6, Line 59, delete " $e2ae$ " and insert -- e2ae --, therefor.

In Column 7, Line 3, delete "TIS," and insert -- TLS, --, therefor.

In Column 7, Line 6, delete "enitiy" and insert -- entity --, therefor.

In Column 7, Line 14, delete " $e2ae$ " and insert -- e2ae --, therefor.

In Column 7, Line 32, delete " $e2ae$ " and insert -- e2ae --, therefor.

In Column 7, Line 53, delete " $e2ae$ " and insert -- e2ae --, therefor.

In Column 8, Line 35, delete " $e2\ ae$ " and insert -- e2ae --, therefor.

In Column 8, Line 39, delete " $e2ae$ " and insert -- e2ae --, therefor.

In Column 8, Line 43, delete " $e2ae$ " and insert -- e2ae --, therefor.

In Column 8, Line 46, delete " $e2ae$ " and insert -- e2ae --, therefor.

In Column 8, Line 49, delete " $e2ae$ " and insert -- e2ae --, therefor.

In Column 8, Line 50, delete " $e2ae$ " and insert -- e2ae --, therefor.

In Column 8, Line 58, delete " $e2ae$ " and insert -- e2ae --, therefor.

In Column 8, Line 62, delete " $e2ae$ " and insert -- e2ae --, therefor.

CERTIFICATE OF CORRECTION (continued)
U.S. Pat. No. 8,549,615 B2

In Column 8, Line 64, delete "e2ae" and insert -- e2ae --, therefor.

In Column 9, Line 4, delete "e2ae" and insert -- e2ae --, therefor.

In Column 9, Line 9, delete "e2ae" and insert -- e2ae --, therefor.

In Column 9, Line 11, delete "e2ae" and insert -- e2ae --, therefor.

In Column 9, Line 21, delete "e2ae" and insert -- e2ae --, therefor.

In Column 9, Line 24, delete "e2ae" and insert -- e2ae --, therefor.

In Column 9, Line 31, delete "e2ae" and insert -- e2ae --, therefor.

In Column 9, Line 35, delete "e2ae" and insert -- e2ae --, therefor.

In Column 9, Line 36, delete "e2ae" and insert -- e2ae --, therefor.

In Column 9, Line 41, delete "e2ae" and insert -- e2ae --, therefor.

In Column 9, Line 67, delete "e2ae" and insert -- e2ae --, therefor.

In Column 10, Line 8, delete "e2ae" and insert -- e2ae --, therefor.

In Column 10, Line 10, delete "e2ae" and insert -- e2ae --, therefor.

In Column 10, Line 22, delete "e2ae" and insert -- e2ae --, therefor.

In Column 11, Line 28, delete "RIP-transported" and insert -- RTP- transported --, therefor.

In Column 11, Line 63, delete "e2ae" and insert -- e2ae --, therefor.